Figure 4A:
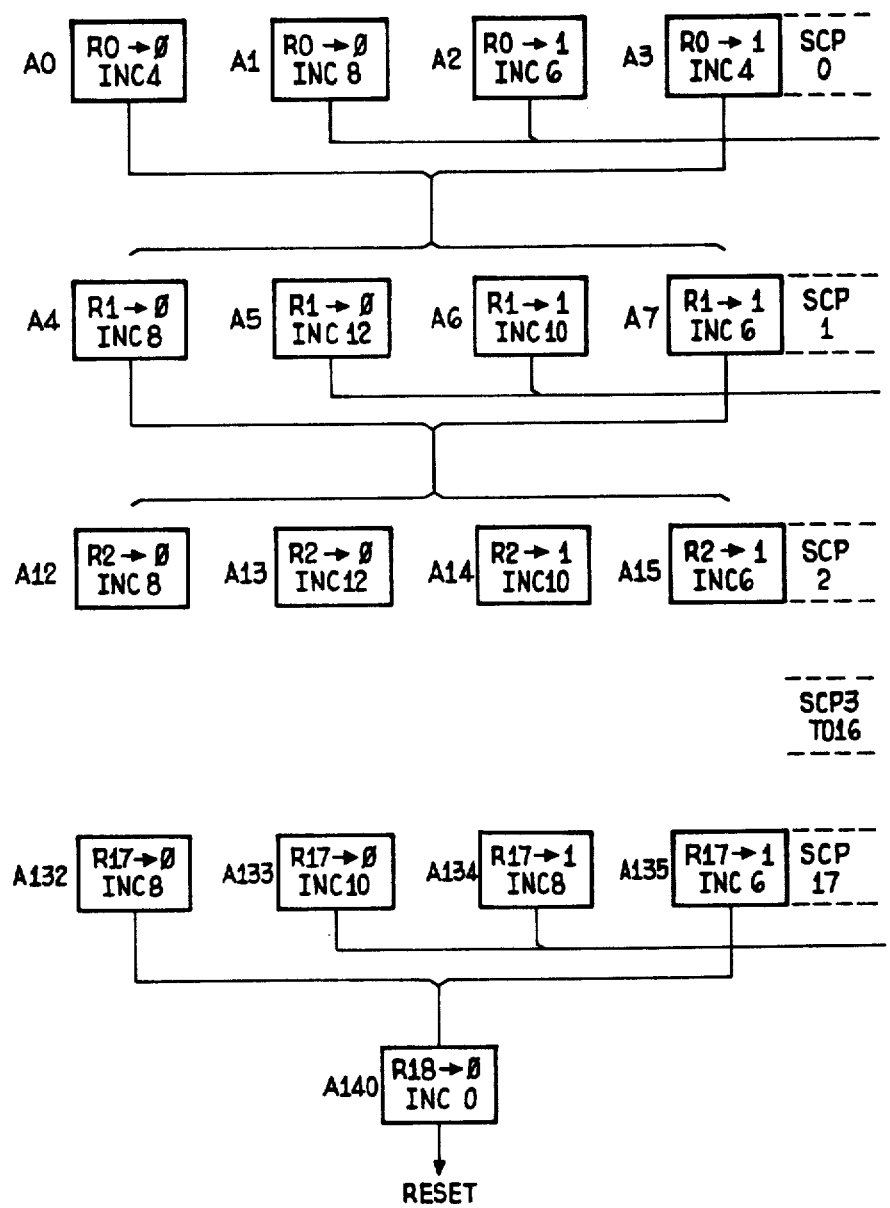

United States Patent [19]

Arnold

[11] 4,041,464
[45] Aug. 9, 1977

[54] DATA PROCESSING SYSTEMS

[75] Inventor: John Spencer Arnold, Liverpool, England

[73] Assignee: Plessey Handel und Investments AG., Zug, Switzerland

[21] Appl. No.: 592,263

[22] Filed: July 1, 1975

[30] Foreign Application Priority Data

July 2, 1974 United Kingdom ............... 29191/74

[51] Int. Cl.² ........................... G06F 9/16; G06F 3/00
[52] U.S. Cl. .................................................. 364/200
[58] Field of Search ................................... 340/172.5

[56] References Cited

U.S. PATENT DOCUMENTS

| 3,673,577 | 6/1972 | Edstrom | 340/172.5 |
| 3,737,869 | 6/1973 | Trelut et al. | 340/172.5 |
| 3,768,079 | 10/1973 | Bittermann et al. | 340/172.5 |
| 3,922,644 | 11/1975 | Borbas et al. | 340/172.5 |

Primary Examiner—Gareth D. Shaw
Assistant Examiner—C. T. Bartz

Attorney, Agent, or Firm—Fleit & Jacobson

[57] ABSTRACT

Several forms of scanner are known: exception reporting, 3-cycle scanning with block exception reporting and response-mode reporting. Additionally positive-edge reporting is now required. The present invention enables the achievement of all these requirements within a rationalized scheme involving a considerably extended field size, and therefore, using a "last-look" 256 or 512 bit shift-register. This is employed in conjunction with a pre-programmed read-only memory, which stores for each different field-type served by the scanner a program relevant to that field. Each program address is formed by injecting the state of the scanned point as a least significant bit carry into an adder fed with (i) the N-1 most significant bits of the previous address in a sequence control register and (ii) an address increment value read from the location previously addressed while the current state of the last-look shift register is used as the least significant bit. Each program location stores an address increment value and last-look shift register update bit.

5 Claims, 9 Drawing Figures

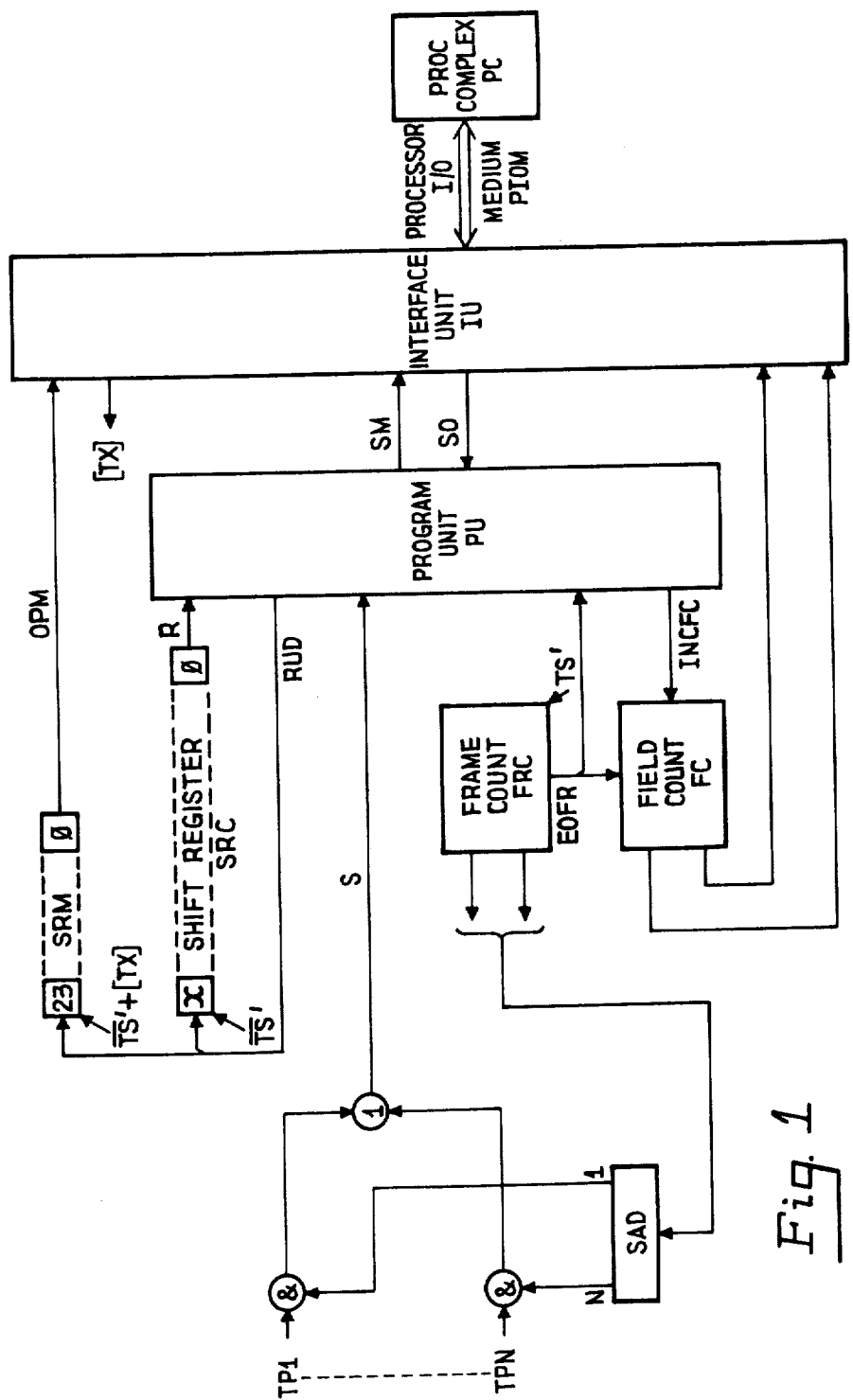

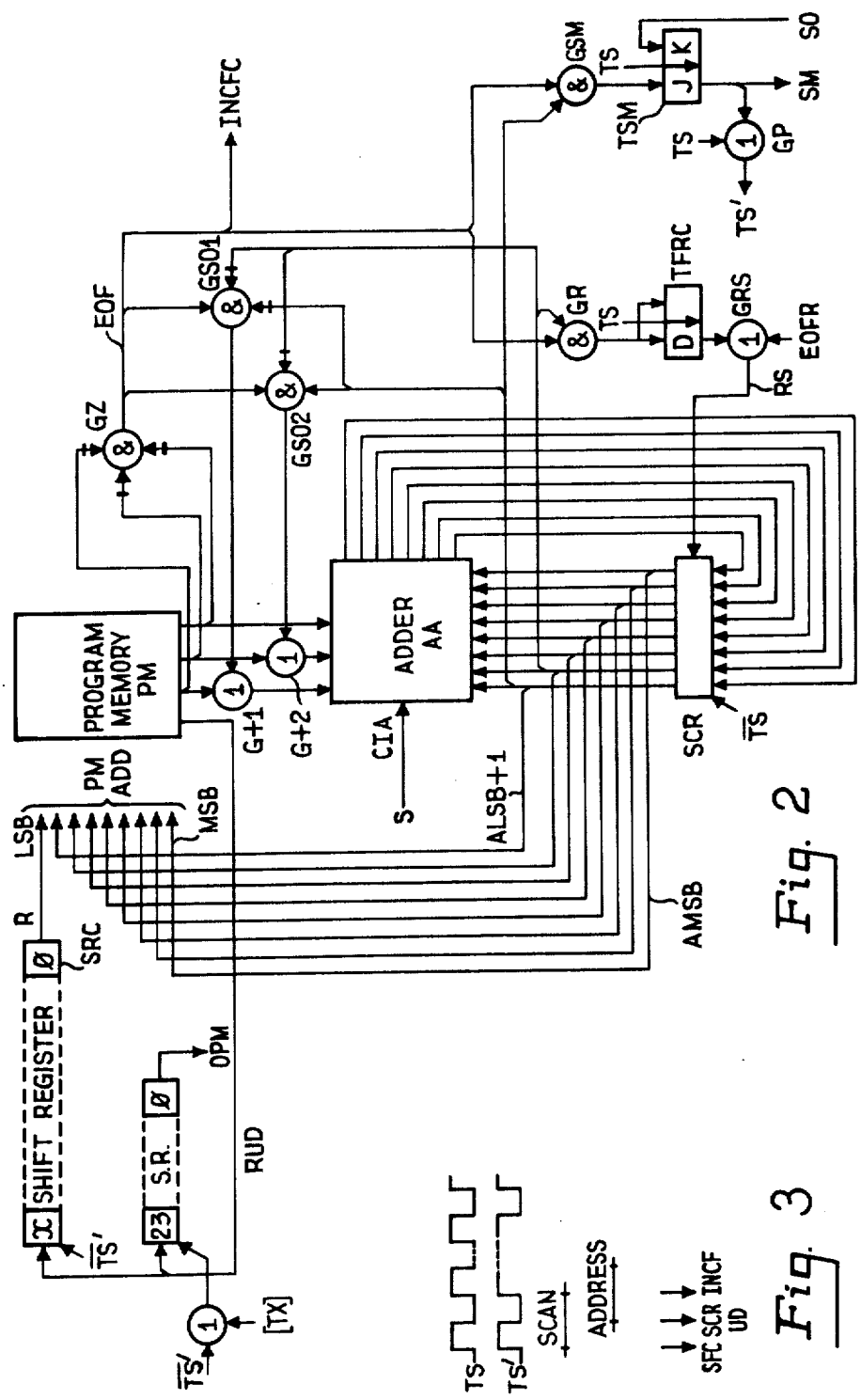

| ROM ADDRESS | BIT 0 NEW R | BITS 1-3 SCR INC |
|---|---|---|
| 0 | 0 | 0 1 0 |
| 1 | 0 | 0 0 1 |
| 2 | 1 | 1 1 0 |
| 3 | 1 | 1 0 0 |
| 4 | 0 | 0 0 1 |
| 5 | 0 | 0 1 1 |
| 6 | 1 | 1 0 1 |
| 7 | 1 | 1 1 0 |
| 8 | 0 | 0 0 1 |
| 9 | 0 | 0 0 1 |
| 10 | 1 | 1 1 0 |
| 11 | 1 | 1 1 0 |
| 12 | 0 | 0 0 1 |
| 13 | 0 | 0 1 1 |
| 14 | 1 | 1 0 1 |
| 15 | 1 | 1 1 0 |
| 16 | 0 | 0 0 1 |
| 17 | 0 | 0 0 1 |
| 18 | 1 | 1 1 0 |
| 19 | 1 | 1 1 0 |
| ⋮ | | |
| 132 | 0 | 0 0 1 |
| 133 | 0 | 1 0 1 |
| 134 | 1 | 0 0 1 |
| 135 | 1 | 1 1 0 |
| 136 | 0 | 1 1 0 |
| 137 | 0 | 1 1 0 |
| 138 | 1 | 0 1 0 |
| 139 | 1 | 0 1 0 |
| 140 | 0 | 0 0 0 |
| 142 | 0 | 0 0 0 |
| 144 | 0 | 0 0 0 |
| 146 | 0 | 0 0 0 |

Fig. 5

| ROM ADDRESS | BIT 0 NEW R | BITS 1-3 SCR INC |
|---|---|---|
| 0 | 0 | 0 1 0 |
| 1 | 0 | 1 1 0 |
| 2 | 1 | 0 1 0 |
| 3 | 1 | 1 1 0 |
| 4 | 0 | 1 1 0 |
| 5 | 0 | 1 0 1 |
| 6 | 0 | 0 1 0 |
| 7 | 1 | 0 1 0 |
| 8 | 1 | 1 1 0 |
| 9 | 1 | 1 0 0 |
| 10 | 0 | 1 0 1 |
| 11 | 0 | 0 0 1 |
| 12 | 1 | 1 1 0 |
| 13 | 1 | 1 0 1 |
| 14 | 0 | 1 0 1 |
| 15 | 0 | 0 1 1 |
| 16 | 1 | 1 0 1 |
| 17 | 1 | 0 1 1 |
| 18 | 0 | 0 1 1 |
| 19 | 1 | 0 1 1 |
| 20 | 0 | 0 1 1 |
| 21 | 0 | 1 1 1 |
| 22 | 1 | 0 1 1 |
| 23 | 1 | 0 0 1 |
| 24 | 0 | 1 0 1 |
| 25 | 0 | 1 0 1 |
| 26 | 0 | 0 0 1 |
| 27 | 1 | 0 0 1 |
| 28 | 1 | 1 1 0 |
| 29 | 1 | 1 1 0 |
| ⋮ | | |
| 228 | 0 | 0 1 1 |
| 229 | 1 | 0 1 1 |
| 230 | 0 | 0 1 1 |
| 231 | 0 | 1 0 1 |
| 232 | 1 | 1 0 1 |
| 233 | 1 | 0 0 1 |
| 234 | 0 | 0 0 1 |
| 235 | 0 | 0 0 1 |
| 236 | 0 | 1 1 0 |
| 237 | 1 | 1 1 0 |
| 238 | 1 | 0 1 0 |
| 239 | 1 | 0 1 0 |
| 240 | 0 | 0 0 0 |
| 242 | 0 | 0 0 0 |

Fig. 7

DATA PROCESSING SYSTEMS

The present invention relates to data processing systems suitable for use in telecommunication switching systems and is more particularly but not exclusively concerned with so-called stored program controlled telecommunication exchange systems.

In such systems the telecommunication exchange comprises a switching network controlled by a processor complex which executes a stored program exchange-control algorithm. The switching network typically employs matrices of either reed relay or electronic crosspoint switching devices. The exchange may either handle so-called analogue traffic or digital (p.c.m.) traffic. Terminated upon the extremities of the switching network are telephone peripheral equipments such as subscriber's or junction line circuits, tone distribution circuits, dialled digit receivers and the like together with the switching network control "marker" arrangement. To provide communication between the switching network and the processor complex, interface equipments are provided allowing processor input and output communication to take place with the telephone peripheral equipments. Typical of a system of the type outlined above is that shown in the article entitled "System 250: Evolutionary Control of Telephone Exchanges" by W. A. C. Hemmings published in the September 1973 issue 17 of Systems Technology at pages 33–37.

The interface equipment in such a system provides "The Scanner/Distributor Function" which performs data collection and distribution between the telephone peripheral equipment hardware and the processor complex. The scanner part of the interface function is used to cyclically collect information from a large number of sources. After collection the information is formed into standard messages for transmission to the processing complex.

The following functions are typical of those required from the scanning point of view:

(i) Exception reporting — reports the contents of a field where at least one bit (i.e. scan point) in the field is changed;

(ii) Persistance exception reporting — as for (i) but the change must persist for two scanner cycles and the change is not reported until the steady state of a field is obtained;

(iii) Response mode reporting — reports the contents of a field when instructed by either a message from a distributor point or a signal from an autonomous telephone peripheral hardware unit such as a marker;

(iv) Digit receiving — detects and reports a dialled digit, an interdigit pause or a cleardown condition and (v) Positive edge reporting — reports the contents of a field as defined in (i), (ii), or (iii) above but only when a scanning point changes from zero to a 1 condition.

Requirements also exist for scanners which are capable of performing a mixture of the above defined functions (e.g. single digit reporting and exception reporting for incoming junctions).

It is an object of the present invention to provide a versatile scanner which is capable of being readily adapted to perform any of the above defined requirements without having to change the interconnection of the hardware forming the scanner.

According to the invention there is provided a scanner for use as an interface equipment between a plurality of points to be tested and a central data processing equipment, said scanner including means for exclusively interrogating on a cyclic basis each of said points, a register having at least one location for each scan point and storing a logical condition relevant to the state of each scan point, a programmed memory each location of which stores information which includes a memory address adjustment value and a register conditioning indication and said memory is addressed in synchronism with the testing of said scan points and as each scan point is tested said program memory is addressed by an $n$ bit address formed in an address adder by combining the memory address adjustment value read out of said memory during the previous memory addressing cycle with the $n - 1$ most significant bits of the previous memory address while employing the state of the bit in said register, which corresponds to the scan point being tested, as the least signficant bit of said address word and using the state of the currently tested scan point as a carry input into the least significant bit of said address adder.

The invention together with its various features will be more readily understood from the following description of one embodiment thereof which should be read in conjunction with the accompanying drawings.

Figure 4B:
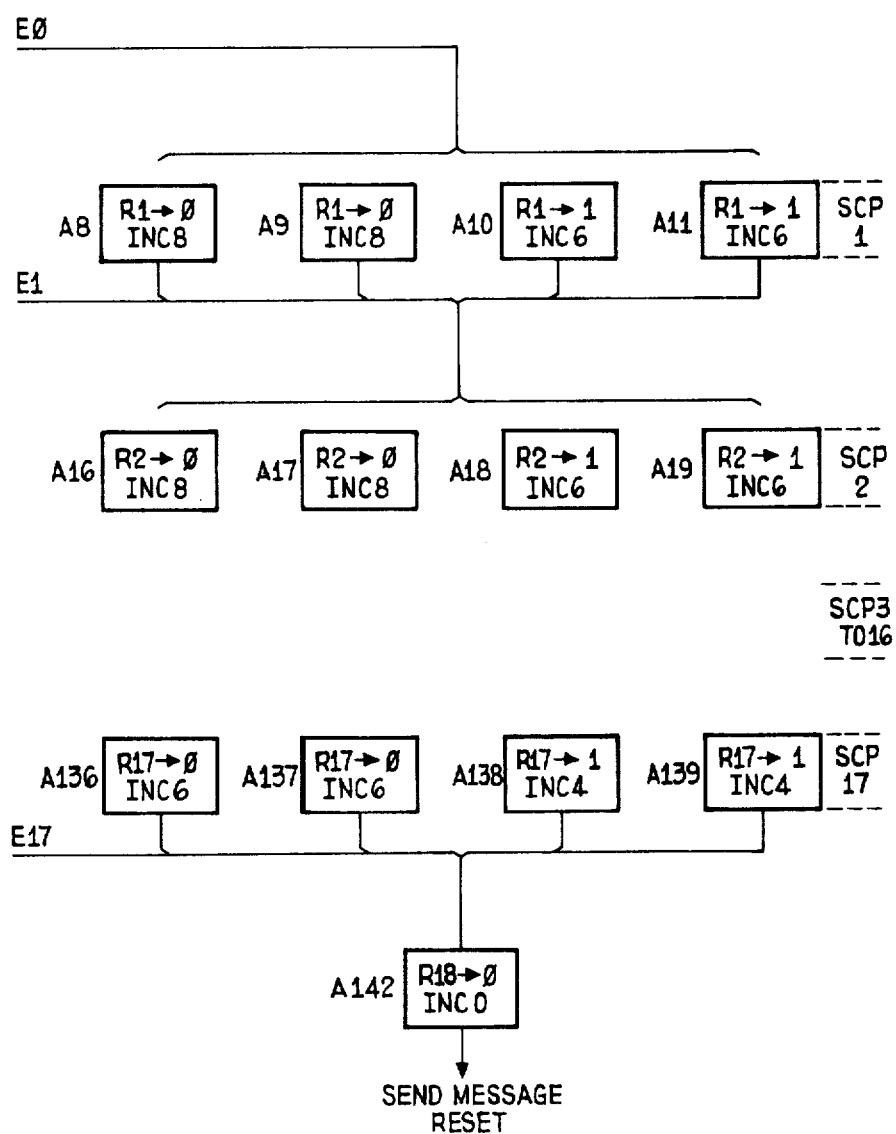
Figure 6A:
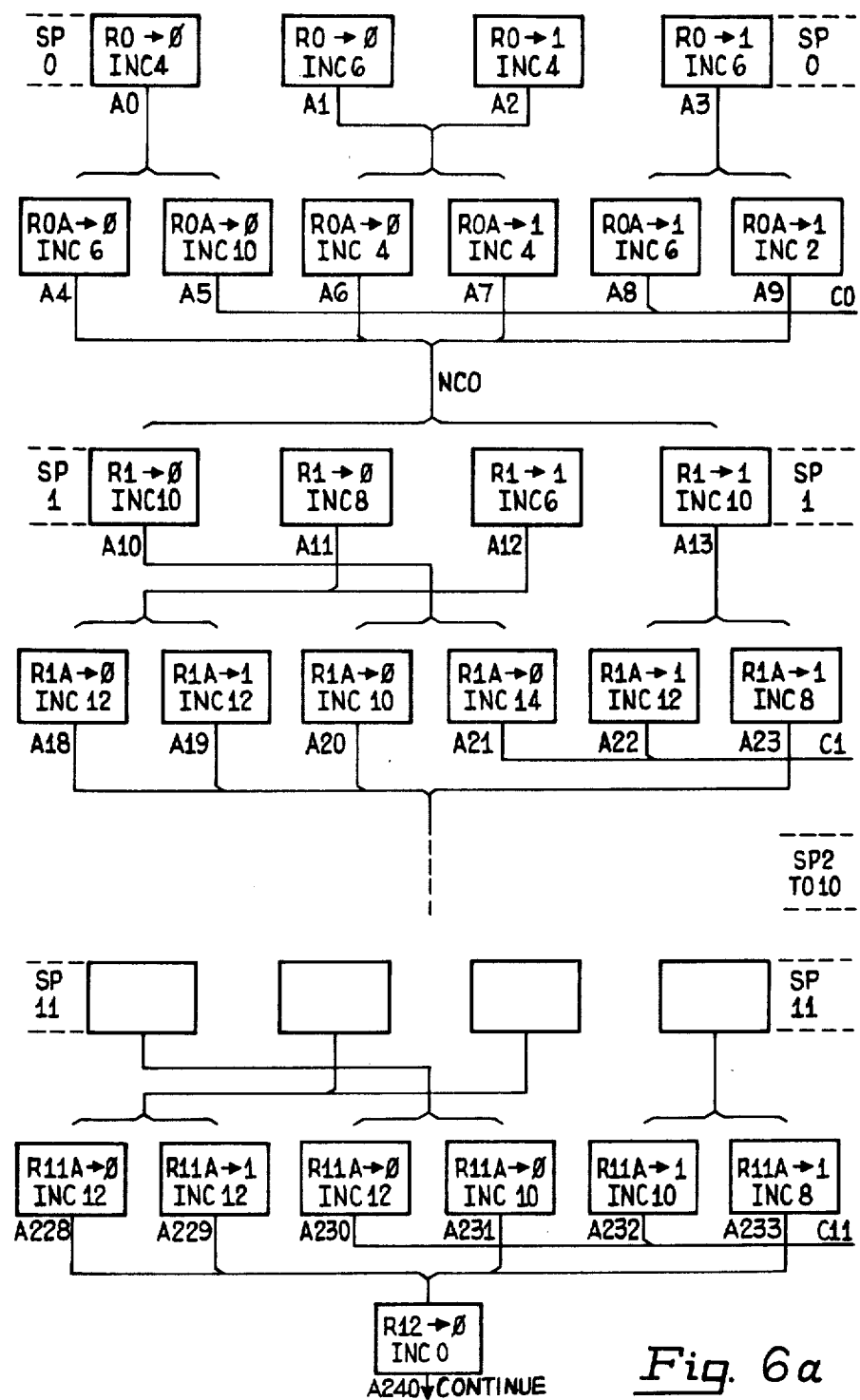
Figure 6B:
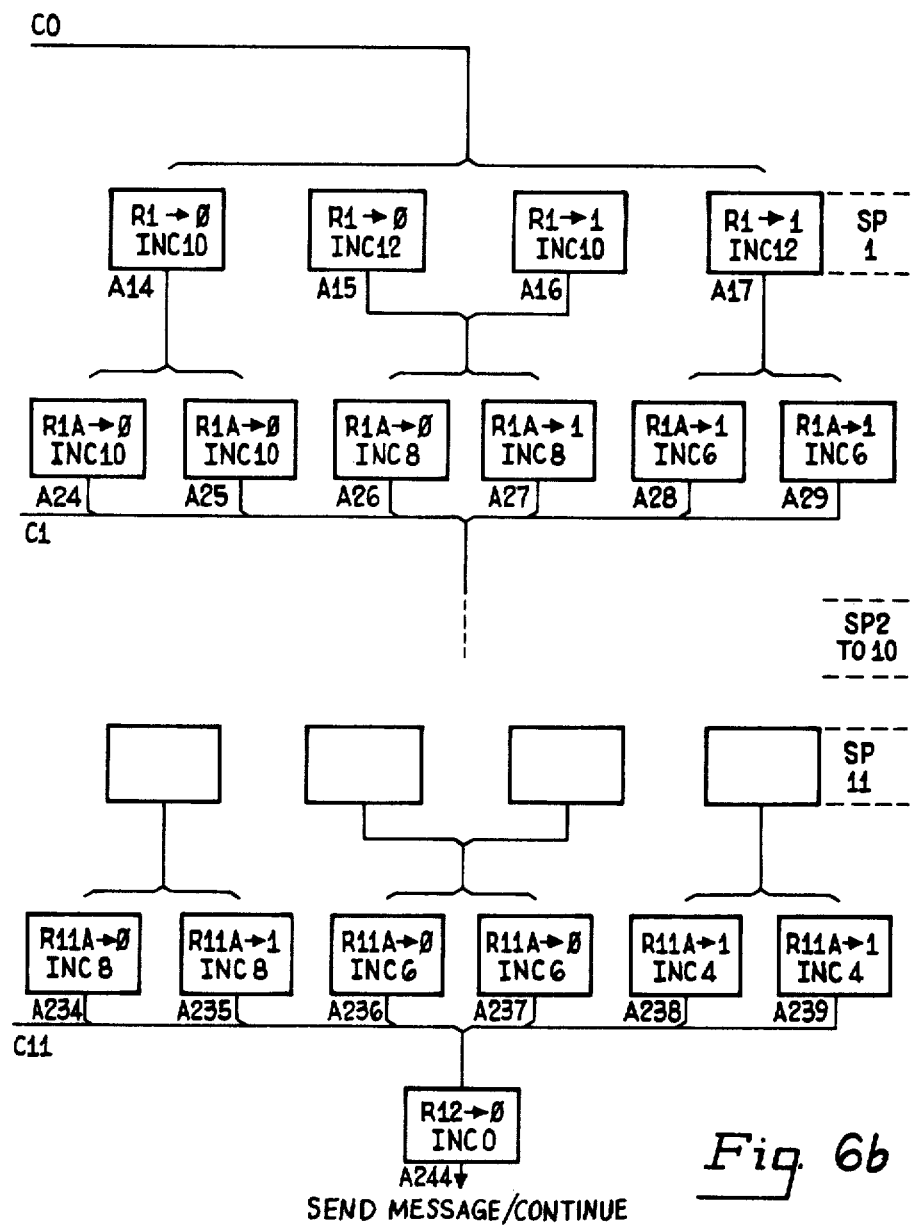

OF THE DRAWINGS:

FIG. 1 shows in block diagram form a scanner according to the invention,

FIG. 2 shows in more detail the program unit of a scanner according to the embodiment of the invention, FIG. 3 shows timing diagrams relevant to the equipment of FIG. 2, FIGS. 4a and 4b, which should be placed side by side with FIG. 4a on the left, show an abbreviated flow diagram of the operations performed by the program memory unit when performing a simple exception reporting function, FIG. 5 shows in tubular form the contents of the program memory unit memory locations used in the steps shown in FIGS. 4a and 4b, FIGS. 6a and 6b, which should be placed side by side with FIG. 6b on the right, show an abbreviated flow diagram of the operation of the program unit when performing a persistance check exception reporting function while FIG. 7 shows in tabular form the contents of the program unit memory locations used in the steps shown in FIGS. 6a and 6b.

Considering firstly FIG. 1 which shows a block schematic diagram of a scanner according to the invention, it will be seen that such a scanner consists of an interface unit IU, a program unit PU, a pair of counters FRC and FC, a pair of shift registers SRC and SRM together with a scan point address decoder SAD.

The interface unit "matches" the scanner to the particular processing complex PC employed by way of the processor input/output medium PIOM. Typically the scanner may be employed in association with a processor complex of the type described in co-pending applications 29670/71 and 21221/73. In practice the interface unit conforms to that of a serial interface unit in these applications connecting the scanner to an outlet of the secondary data switches of the serial input/output medium and accordingly the interface unit has the responsibility of organising the transmission of a data message having an address section and a data section in accordance with the instructions used in such a serial medium. The data section is of 24 bits corresponding to a store word as used in these applications.

The major sequences of the scanner involve the program unit PU and the control shift register SRC together with the scan condition lead S. The program unit PU will be described in greater detail with reference to FIG. 2 later as will the control shift register SRC. Shift register SRM is used to accumulate a field of information for transmission, on a lead OPM, to the interface unit IU when a change of scan point state has been detected.

The testing of the scan points is performed sequentially under the control of frame counter FRC which is driven by a timing pulse TS' which is the inverse of that used to control the shift register SRC. The output of the frame counter FRC is used to drive the scan address decoder SAD which has at least one output for each scan point (shown as TP1 to TPN in FIG. 1) to be tested by the scanner. In practice these scan points are grouped into fields and such arrangements will be more readily appreciated later. The program unit PU receives and "end-of-frame" signal EOFR from the frame counter FRC to provide a reset to the program unit after completion of the complete scan point testing frame thereby ensuring synchronism even if the field size does not exactly divide into the number of slots in a frame. The field counter FC is incremented by way of an increase field count signal on lead INCFC at the completion of each field so that the counter FC provides an indication to the interface unit IU of the identity of the field currently held in shift register SRM.

Referring now to FIG. 2 a detailed description of the performance of the program unit will be given. The shift register SRC typically includes 256 bits and a corresponding frame count is therefore assumed. The program memory includes a variable number of locations dependant upon the programs required, typically 256 locations are provided in the store. Each location includes an address increment value and a control register conditioning indication and at each slot in the frame a discrete program memory location is addressed. The control register conditioning indication is supplied, at each program unit step over lead RUD, to both the control shift register SRC and the message shift register SRM. The signal on lead RUD is used to condition the control shift register with an indication which is used as being pertinent to the stage of the scan line in the previous testing frame for use during the next frame as well as an indication for use in a data message.

Each program step involves the addressing of the program memory with a nine-bit address, the eight most-significant-bits of which are derived from a sequence control register SCR. The contents of this register are updated by the output of an address adder AA during each program step. The information applied to the address adder is the current program step address as held in the SCR together with the current program step memory increment value read from the program memory and a carry injected into the least significant bit of the adder generated in accordance with the stage of the currently tested scan point. The least significant bit LSB of the program memory address PMADD is derived from the output of the control shift register SRC. This bit it will be recalled is relevant to the state of the scanned point when last tested. It will thus be seen that at each program step there may be a four way branch in accordance with the states of leads R and S and this effect will be more readily seen when considering specific programs as depicted in FIGS. 4a and 4b or FIGS. 6a and 6b.

It will be recalled that the four bit word produced when a program memory location is addressed comprises a new control register state (or lead RUD) together with three bits defining the sequence control register increment value. Increment values of zero it will be realised are meaningless and such a condition is used as an indicator for the end of a field to generate signal EOF and consequently signal INCFC to update the field counter FC in FIG. 1. In fact one of four conditions are experienced at the end of each field depending upon whether the field has changed or not and whether the program for the next field is the same as the last field or not. Should the field have experienced a change a message transmission (involving the interface unit IU in FIG. 1 driven from the shift register SRM over lead OPM) is necessary. This message transmission involves the use of timing signals TX to drive the shift register SRM generated by the interface unit when the message is to be sent. It will be seen with reference to FIG. 2 that the control shift register SRC is not shifted by the TX pulses and, therefore, is interrupted until the message is sent. However if the field currently tested is not the same as the next field in the frame then the program memory must be arranged to "step-on" to a new program to control the testing of the next field in the frame otherwise the SCR is reset and the program unit restarts the same program for the next field. The various functions performed by the equipment shown in FIG. 2 will be more readily understood when considering specific conditions in relation to the scanner operations to be considered later. FIG. 3, which shows the timing diagram relevant to the operations performed in FIG. 2, indicates that three discrete operation points occur in each scan slot. The first (designated SFC) corresponds to the stepping of the frame counter (FRC in FIG. 1). The second (designated SCRUD) corresponds to the updating of the sequence control register SCR, whereas the third, (designated INCF) marks the point at which the new information is presented at the output of the program memory and corresponds to point SFC in the next scan slot period. In FIG. 3 the waveform TS indicates a continuous series of timing pulses generated for example by an oscillator which is not shown in the drawings. The waveform TS', however, is generated by the toggle/gating arrangement TSM/GSM/GP. The leads marked TS' in FIG. 2 it should be pointed out carry the inverse of the waveform TS'.

Considering now FIGS. 4a and 4b together with FIG. 5 the operations performed by the scanner (of FIGS. 1 and 2) in the testing of a field of scan points in accordance with the simple exception reporting techniques will be considered. It will be assumed that 18 such scan points form a field in this case. It will be further assumed that the field in question occupies scan slots 0 to 18 of a particular scanner frame (i.e. bits R0 to R18 of register SRC). Accordingly the sequence control register SCR in FIG. 2 will be reset to all 0's either by an "end of frame" signal on lead EOFR or by the setting of toggle TFRC immediately prior to the starting of the testing of the field in question.

The resetting of the sequence control register SCR (FIG. 2) and the frame counter FRC (FIG. 1) causes the first scan point SCP0 of the field to be tested. It will be assumed that test points TP1 to TP18 (of FIG. 1) are connected to scan points SCP0 to SCP17 respectively. Accordingly for the scanning of the first scan point of the field the condition of lead S in FIG. 1 and 2 will assume that of the current state of the scan point SCP0. When the leading edge of waveform TS' occurs (i.e. in the middle of a scan slot period) the control shift register SRC will produce, on lead R, the state of the scan point SCP0 the last time the scanner tested that point (i.e. in the previous frame). It will be recalled, with reference to FIG. 3 that at the start of the scan slot the frame counter, having been reset, conditioned the scan address decoder to interrogate the first scan point. Accordingly as lead S in FIG. 2 assumes the current state of scan point SCP0, lead R assumes the state of point SCP0 in the previous scan frame on the rising edge of TS' while the current state of the sequence control register SCR is zero, any one of four program memory locations will be addressed when the adder AA updates the sequence control register SCR (i.e. at point SCRUD in FIG. 3).

FIGS. 4a and 4b show a flow diagram of the simple exception reporting program for the first three and the last scan points of the 18 bit field and addresses A0 to A3 show the program locations used for the first (i.e. SCP0) scan point of the field. FIG. 5 shows the contents of these four locations under similar references. It will be recalled that the least significant bit of the program address PMADD is provided by the output of the control shift register SRC on lead R while the state of SCP0 is applied as a carry into the least significant bit of the adder AA. Accordingly the state of these two bits define the location addressed as follows:

(1) R = S = 0 — Address A0
(2) R = 1; S = S — Address A1
(3) R = 0; S = 1 — Address A2
(4) R = 1; S = 1 — Address A3

The first and last of these conditions indicate that the scan points are in a steady state condition whereas the second and third conditions indicate respectively a change to 0 and a change to 1 of the scan point.

From FIGS. 4a and 4b it will be seen that the information stored at each of these addresses defines (i) the state to which the R bit (corresponding to the scan point tested) in shift register SRC is to be set and (ii) the sequence control register increment value. The actual information stored is shown in FIG. 5.

The program locations are segregated into two program sections according to the detection of (a) no change or (b) one or more changes in scan point state of the field and these sections are shown in FIG. 4a and FIG. 4b respectively. After the first scan point (SCP0) each scan point (SCP1 to SCP17) has a corresponding block of four locations in each section and exit from section (a) (i.e. FIG. 4a) is performed upon the detection of the first changed scan point. Once the program has entered section (b) (i.e. FIG. 4b) the decision has been made to send a message regardless of the states of any succeeding scan points in the field and the program remains in section (b) until the testing of the field is completed.

Hence if no changes are detected in the scanning of the 18 bit field the exit from the program step testing scan point SCP17 will involve address locations A132 or A135. It will be assumed that the scanner has responsiblity for a number (i.e. 13) eighteen bit exception reporting fields. After the scanning of each field the program unit is reset so that the program is restarted for each field until all the fields of a frame have been scanned. The unequipped final nine bits of SRC are accommodated by the EOFR signal. The increment values shown in FIG. 5 for locations A132 and A135 show that the final step in program section (a) is that controlled by location A140. FIG. 5 shows the contents of the location A140 as being 0 000. As mentioned previously an address increment of zero is detected (by gate GZ) as an end of field condition EOF. Signal EOF causes toggle TFRC, which is of the so-called D type, to be triggered on the rising edge of the next TS pulse by the reset scan gate GR to open gate GRS and generate the reset signal RS. Gate GR is opened since signal EOF is in the 1 state and the current address in the sequence control register SCR is address A140 (i.e. in binary 01100010). The second least significant bit being a 1 opens gate GR. Signal RS causes the sequence control register SCR to be reset. The resetting of the sequence control register SCR closes gate GR permitting the reset of toggle TFRC on the rising edge of waveform TS.

The above observations in connection with FIG. 4a have been relative to the situation encountered when no change is detected throughout a field scan. If a change occurs the change detecting steps such as A1 and A3, A5 and A6 etc. to A133 and A134 cause entry into the (b) section of the program shown in FIG. 4b. The entry points are shown as E0, E1 etc. to E17 in FIGS. 4a and 4b.

Accordingly once a change of state has been detected the program sequence ends with entry into a step controlled by location A142. FIG. 5 shows the information stored in this location and again signal EOF will be generated by gate GZ. In this case, however, the program must be halted until the shift register SRM has been emptied into the interface unit IU (in FIG. 1). Gate GSM as well as gate GR will be opened (SCR output = 11100010) in these conditions. The opening of gate GSM causes toggle TSM to be set on the occurrence of the next TS pulse. Toggle TFRC will also be set by this TS pulse to generate signal RS to recirculate the shift register SRC back-to-normal and to reset to zero the SCR. The setting of toggle TSM generates signal SM to prime the interface unit IU in FIG. 1 to establish a communication path with the processor multiplex and when so established the timing pulses TX are generated by the interface unit IU to empty the message shift register SRM via the interface unit into the processor complex. Throughout the message transmission period toggle TSM remains set thereby holding the output of gate GP and consequently pulse waveform TS' at the 1 state.

When the transfer is complete the interface unit IU in FIG. 1 produces a step-on signal SO which resets toggle TSM in FIG. 2 allowing gate GP to again respond to waveform TS.

The above description relative to FIGS. 4a and 4b has shown the use of the scanner of the invention in the performance of an exception reporting function reporting the current state of the field in a message at the end of the scanning of that field upon the detection of one or more changes of scan point state. Minor modification can be made to the program if exception reporting of a change from 0 to 1 only is required for example. In such a case locations A1, A5, A13 etc. to A133 will be modified so that the increment value is 4 for A1 and 8 for all the remaining locations of that group. Alternatively suitable modifications to locations A2, A6, A14 etc. to A134 can be made if detection only of 1 to 0 changes are to be reported.

In addition to the simple exception reporting facilities of FIGS. 4a and 4b the scanner may be programmed to provide more complex scanning functions and one of these, reporting a change only when such change has persisted for at least the duration of one complete scan, will be considered with reference to FIGS. 6a and 6b.

The program in the "persistance-checked-exception-reporting" case requires two control shift register bits per scan point. The first bit of the pair (designated R0, R1 etc. to R11) is used to store the state of the scan point while the second bit of the pair (designated R0A, R1A etc. to R11A) is used to detect the persistance of a change. Because of the use of 2 bits per scan point a persistance checked exception reporting field has the maximum size of 12 (there being 24 bits max. in shift register SRM in the specific embodiment). Because of this arrangement the scan address decoder SAD in FIG. 1 is arranged to select a scan point only on each even scan slot period.

Again it will be assumed that the field in question starts at the start of a frame period and accordingly the sequence control register SCR will be reset to zero. The scan address decoder SAD of FIG. 1 will select the first scan point SPO of the field and the state of that scan point will be passed to the adder AA on lead S. When the first TS' pulse occurs the control shift register will pass the R0 to the least significant bit position of the program memory address PMADD. As in the previous case the states of the R and S bits define which of four locations is addressed as follows:

(1) R = S = 0 — Address A0
(2) R = 1; S = 0 — Address A1
(3) R = 0; S = 1 — Address A2
(4) R = S = 1 — Address A3

The second and third conditions indicate the detection of a change of state of the scan point while the first and fourth conditions indicate no change of state of the scan point. Hence for a persistant change to be detected it is necessary for the changed condition to be detected and checked at the next succeeding scan to ensure that the "changed-to" state still appertains before the change is reported. The temporary storage of the initial change of state is performed by the additional bit of the pair.

Hence if a change of state of scan point SPO is detected either location A1 or A2 will be addressed in the scan slot period. 0 in the shift register SRC will be set to either 0 or 1 respectively and the SCR will be incremented to A6. It will be assumed that scan point SPO has changed from a 0 to a 1 since that scan point was last scanned and that prior to the change the point had been persistently at the 0 state. The program memory will produce an address increment of four and R0 will be set to the 1 state (i.e. location A2 will be addressed) in the SPO scan slot. In the following slot no scan point is selected and the ROA bit will be 0. Accordingly location A6 will be addressed progressing the program along the "no-change" section (a) of the program shown in FIG. 6a. Similar steps are performed for each scan point in the field and if no persistant change is detected during the scanning of the field the program for that field will terminate by an increment to location A240. Reference to FIG. 7 shows that the increment value of zero causes the opening of gate GZ and because of the address values of 00 011110 in the SCR gate GS02 will be opened and gate GI will open to force an increment of $2^2$ into the adder by way of gate G + 2. This has the effect of incrementing the address value on to A244 which is the start address for the next program.

So far some 25 bits of SRC have been used and some 244 program memory addresses. Typically some eight fields of persistance checked scan points may be accommodated leaving some 56 bits for use (in blocks of 7 bits) with the other program which may use some eleven addresses dependent upon the size of the program memory etc. but it will be readily appreciated by those skilled in the art that such requirements are easily met.

At some subsequent time the scanner will recommence the testing of scan point SPO and in this case RO = SO = 1 and ROA = 0. Hence when the SCR is reset the next location selected will be A3. The next program step slot, with ROA = 0, is controlled by the information in location A8 which causes the program to continue in the "persistant-change-detected" section (b) of the program shown in FIG. 6b. This "path" is shown as CO in FIG. 6a into 6b.

At the end of the field the final step controlled by location A242 causes the EOF signal to be generated by gate GZ. Gates GSM and GS01 are opened setting toggle TSM on the rising edge of the next TS pulse and injecting an increment of $2^1$ into the adder by way of gate G + 1. The setting of toggle TSM causes the transmission of the message containing the indication of the persistant detected change. The operations performed are obviously the same as those defined above previously relative to a message transmission. When the message has been transmitted toggle TSM will be reset allowing the program memory to be addressed with the contents of sequence control register SCR thereby steppingon to the start of the next field.

Similarly a change from 0 to 1 is detected using location A3 and A8 before the change, locations A1 and A7 when the change is scanned and locations A0 and A5 when the persistance change has been detected.

Obviously similar arrangements are provided at each scan point as depicted in FIGS. 6a and 6b of the drawings. Again if only a persistant change in one direction is required to be detected minor modifications to the program shown in FIGS. 6a and 6b can easily be made.

Reference to FIGS. 6a and 6b will also show how an unconfirmed change does not switch the program from section (a) or (b). Typically considering scan point SP0 and firstly a change from a persistant 0 condition to a temporary 1 condition which is detected on the second scan below but not confirmed, the sequence would be as follows:
first scan
  R0 = S = 0 — location A0 (R0 = 0)
  ROA = 0 — location A4 (ROA = 0)
  No change.
second scan
  R0 = 0; S = 1 — location A2 (R0 = 1)
  ROA = 0 - location A6 (ROA = 0)
  No change.
third scan
  R0 = 1; S = 0 — location A1 (R0 = 0)
  ROA = 0 — location A6 (ROA = 0)
  No change.

Similarly if SPO was persistantly 1 and temporarily changed to 0 which is detected but persist for less than a frame period the sequence would be as follows:
first scan
  R0 = S = 1 — location A3 (R0 = 1)
  ROA = 1 — location A9 (ROA = 1)
  No change.
second scan
  R0 = 0; S = 0 — location A1 (R0 = 0)

ROA = 1 - location 7 (ROA = 1)
No change.
third scan
RO = 0; S = 1 — location A2 (RO = 1)
ROA = 1 — location 7 (ROA = 1)
No change.

Obviously similar situations occur relative to other scan points with substantially identical results.

It will be realised by those skilled in the art that other scanner functions may readily be "programmed" into the program memory so that a scanner capable of performing any of the functions referred to in the introduction to this specification may be produced by the teachings of the invention.

What I claim is:

1. A scanner for use as an interface equipment between a plurality of binary digital data scan points to be interrogated and a central data processing equipment, the scanner being arranged to detect, temporarily store and report changes of state of the scan points by cyclically performing a scanning sequence, the scanner including:

a counter means and scan point selection means for cyclically interrogating the state of each of the scan points during a scanning sequence, a control register having at least one location for each scan point and being arranged to store information relative to the condition of the scan point when last interrogated and a program unit including (1) a program memory each location of which stores information which includes a program memory adjustment value and a control register conditioning indication, (2) a program memory addressing mechanism for selecting the program memory location to be read out in accordance with an n-bit address word and (3) an address adder for forming the n-1 most significant bits of said address word by adding (a) a memory adjustment value read from the program memory to (b) the n-1 most significant bits of the current memory address in said program memory addressing mechanism and (c) the binary value of the state of the scan point currently being interrogated, the scanner being arranged when performing a scanning sequence to address each scan point to be interrogated in sequence and as each scan point is interrogated a program memory location is addressed by the n-bit address word formed by said addressing mechanism by the output from said address adder together with the binary state of the corresponding bit in the control register relative to the scan point being interrogated said corresponding bit being used to form the least significant bit of the address word and at each sequence step and corresponding bit in the control register after use is set to the state indicated by the register conditioning indication read out of the program memory during the current scanning sequence step.

2. A scanner according to claim 1 wherein said program memory includes first and second sets of locations for each scanning sequence said first set being used while no change in the state of any of the interrogated scan points has been detected whereas the second set is used throughout the rest of a scanning sequence once a changed state scan point has been detected, change from said first set to said second set being achieved by the program memory address generated when the first changed state scan point is encountered and the final step of said second set operates scan point condition transmission means which causes the state of each scan point under interrogation in the scanning sequence to be transmitted to said central data processing equipment.

3. A scanner according to claim 2 and including a message assembly register fed in parallel with said control register and said scanner also includes means for suspending a scanning sequence during said final step of said second set while a message including the contents of said message assembly register is sent to the central data processing equipment.

4. A scanner according to claim 3 wherein the scan points to be interrogated are arranged in fields of like points and the final step in a sequence in which no point is interrogated causes a program memory location to be read out holding a characteristic code and conditions internal to the program unit are used to define if the program unit should be (1) reset to reexecute the completed program on the next field or (2) stepped on to another program and the scanner includes a field counter arranged to be stepped by the performance of each final step and the count in said field counter is included in the message sent to said central data processing equipment.

5. A scanner according to claim 4 wherein said control and message assembly registers are shift registers fed under the control of shift pulses which control said means for interrogating each of said scan points whereas said message assembly register is read out under the control of shift pulses generated by said central data processing equipment.

* * * * *